United States Patent [19]
Heo

[11] Patent Number: 5,398,059
[45] Date of Patent: Mar. 14, 1995

[54] OVERLAP APPARATUS FOR DIGITAL TV

[75] Inventor: Jae S. Heo, Kyungsangbook-Do, Rep. of Korea

[73] Assignee: Goldstar Co., Ltd., Seoul, Rep. of Korea

[21] Appl. No.: 95,358

[22] Filed: Jul. 20, 1993

Related U.S. Application Data

[63] Continuation of Ser. No. 812,637, Dec. 23, 1991, abandoned.

[30] Foreign Application Priority Data

Dec. 31, 1990 [KR] Rep. of Korea ............... 22983

[51] Int. Cl.$^6$ .......................................... H04N 5/262
[52] U.S. Cl. ..................................... 348/239; 348/222
[58] Field of Search ................. 358/182, 22, 906; 348/239, 222, 906

[56] References Cited

U.S. PATENT DOCUMENTS 5,003,404 3/1991 Yoshimura et al. ............... 358/182
5,132,798 7/1992 Yoshimura ....................... 358/182

FOREIGN PATENT DOCUMENTS 2158318 11/1985 United Kingdom ............... 358/182

Primary Examiner—Alvin E. Oberley
Assistant Examiner—Minsun Oh
Attorney, Agent, or Firm—Rosen, Dainow & Jacobs

[57] ABSTRACT

An overlap apparatus for a digital TV includes an overlap control unit for controlling the overlap operation of the apparatus by the selection of the user. An overlap processing unit gradually increases the level of an input video signal and gradually decreases the level of a feedback video signal in an overlap mode control of the overlap control unit, to generate an overlapped video signal. An overflow limiting unit limits the overflow characteristic of the output signal from the overlap processing unit. An overlap video storing unit stores the output signal from the overflow limiting unit in a normal mode control of the overlap control unit and outputs the signal stored therein as the feedback video signal to the overlap processing unit in the overlap mode control of the overlap control unit. A D/A converter converts the output signal from the overflow limiting unit into an analog signal.

7 Claims, 3 Drawing Sheets

F I G. 3
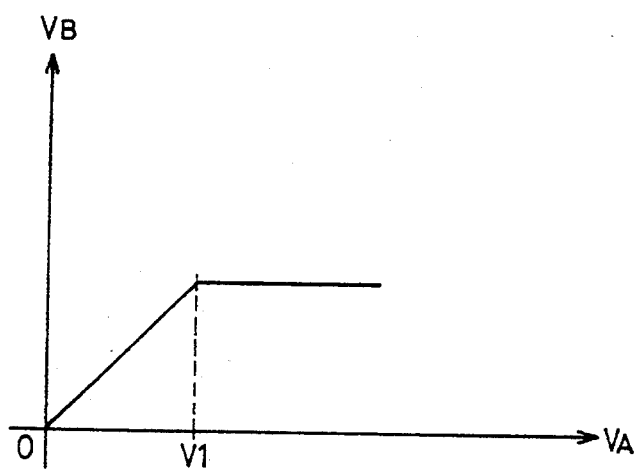

OVERLAP APPARATUS FOR DIGITAL TV

This application is a continuation of application Ser. No. 07/812,637, filed Dec. 23, 1991, now abandoned.

BACKGROUND OF THE INVENTION

1. Field of the Invention

The present invention relates in general to an overlap apparatus for a digital TV, and more particularly to an overlap apparatus for a digital TV, which is capable of overlapping a specific video on the current video on the screen with their brightnesses being inversely proportional to one another when the specific video is overlapped on the current video on the screen.

2. Description of the Prior Art

Generally, the overlapping of videos on the screen is a type of video processing technique in which a new video is caused to be overlapped on the current video, appearing gradually on the screen while the current video disappears gradually from the screen. The video overlap technique is mainly employed in filming applications. In TV applications, video overlap equipment is employed in a broadcasting station for the provision of video overlap as a special effect.

However, in the conventional digital TV applications, no means have been provided which are capable of overlapping a desired video on the current video on the screen in accordance with the selection of the viewer, although the broadcasting station can provide the viewer with the video overlap as a special effect. For this reason, the conventional video overlap technique for digital TV cannot meet the viewer's desire for the video overlap on screen.

SUMMARY OF THE INVENTION

Therefore, it is an object of the present invention to provide an overlap apparatus for a digital TV, which is capable of storing a desired specific video and overlapping the stored specific video on the current video on the screen in accordance with a selection of the viewer, by a simple operation of a remote transmitter by the viewer, when the viewer would like to watch the desired specific video which is overlapped on the current video on the screen while he or she watches TV, so that the viewer can enjoy the overlapped video on the screen by his or her own selection.

In accordance with the present invention, the above object can be accomplished by providing an overlap apparatus for a digital TV, comprises: an overlap control unit for controlling an overlap operation of the apparatus in accordance with a selection of the user. An overlap processing unit is provided for gradually increasing the level of an input video signal and gradually decreasing the level of a feedback video signal to be overlapped under an overlap mode control of the overlap control unit, to generate an overlapped video signal in which the input video signal is combined with the feedback video signal. An overflow limits unit for limiting an overflow characteristic of an output signal from the overlap processing unit. An overlap video storing unit storing the output signal from the overflow limiting unit under a normal mode control of the overlap control unit and outputs the signal stored therein as the feedback video signal to the overlap processing unit in the overlap mode control of the overlap control unit. A D/A converting unit converts the output signal from the overflow limiting unit into an analog signal and outputs the analog signal to a monitor.

BRIEF DESCRIPTION OF THE DRAWINGS

The above and other objects, features and advantages of the present invention will be more clearly understood from the following detailed description taken in conjunction with the accompanying drawings, in which:

FIG. 3 is an view illustrating a overflow limiting characteristic of the overlap apparatus of FIG. 1 in accordance with the present invention.

DESCRIPTION OF PREFERRED EMBODIMENTS

First, a construction an overlap apparatus for a digital TV in accordance with the present invention will described with reference to FIG. 1.

Figure 1:
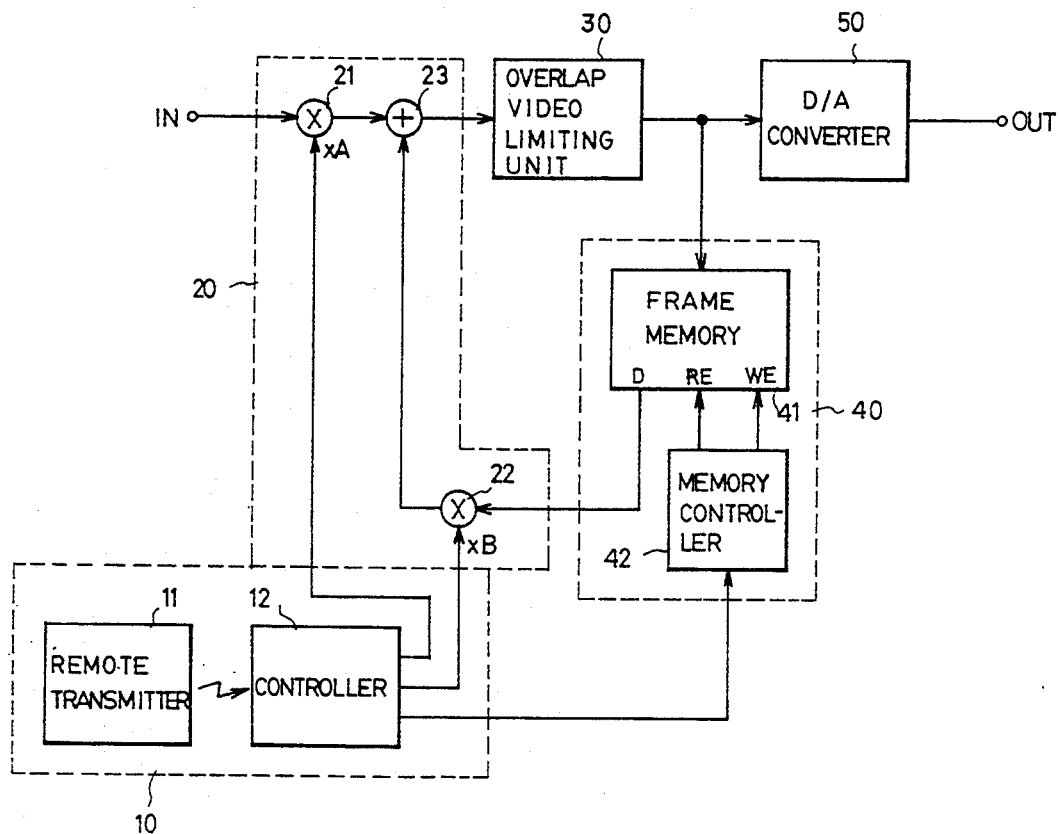
FIG. 1 is a block diagram of overlap apparatus for a digital TV in accordance with the present invention.

FIG. 1 is a block diagram of an overlap apparatus for a digital TV in accordance with the present invention. As shown in this drawing, the overlap apparatus of the present invention comprises an overlap control unit 10 for controlling an overlap operation by the apparatus in accordance with a selection of the user, an overlap processing unit 20 for increasing the level of an input video signal gradually and decreasing a level of a feedback video signal to be overlapped, or overlap video signal gradually under an overlap mode control of the overlap control unit 10, to generate an overlapped video signal in which the input video signal is combined with the feedback video signal, an overflow limiting unit 30 for limiting an overflow characteristic of an output signal from the overlap processing unit 20, an overlap video storing unit 40 for storing an output signal from the overflow limiting unit 30 under a normal mode control of the overlap control unit 10 and outputting the signal stored therein as the feedback video signal to the overlap processing unit 20 under the overlap mode control of the overlap control unit 10, and a D/A converter 50 for converting the output signal from the overflow limiting unit 30 into an analog signal and outputting the analog signal to a monitor (not shown).

The overlap control unit 10 includes a remote transmitter 11 with an overlap/normal mode select switch, and a controller 12 for outputting an input video multiplier factor A to be gradually increased, a feedback video multiplier factor B to be gradually decreased and a memory control signal, in response to an overlap mode select signal from the remote transmitter 11 in accordance with a selection by the user.

Also, the overlap processing unit 20 includes a first multiplier 21 for multiplying the input, video signal by the input video multiplier factor A outputted from the overlap control unit 10 to gradually increase the level of the input video signal, a second multiplier 22 for multiplying the feedback video signal from the overlap video storing unit 40 by the feedback video multiplier factor B outputted from the overlap control unit 10 to gradually decrease the level of the feedback video signal, and an adder 23 for combining the output signal from the first multiplier 21 with the output signal from the second multiplier 22 to output the overlapped video signal to the overflow limiting unit 30.

On the other hand, the overlap video storing unit 40 includes a frame memory 41 for storing the output signal from the overflow limiting unit 30 by the frame, and a memory controller 42 for controlling read/write operations of the frame memory 41 in response to the memory control signal from the overlap control unit 10.

Figure 2:
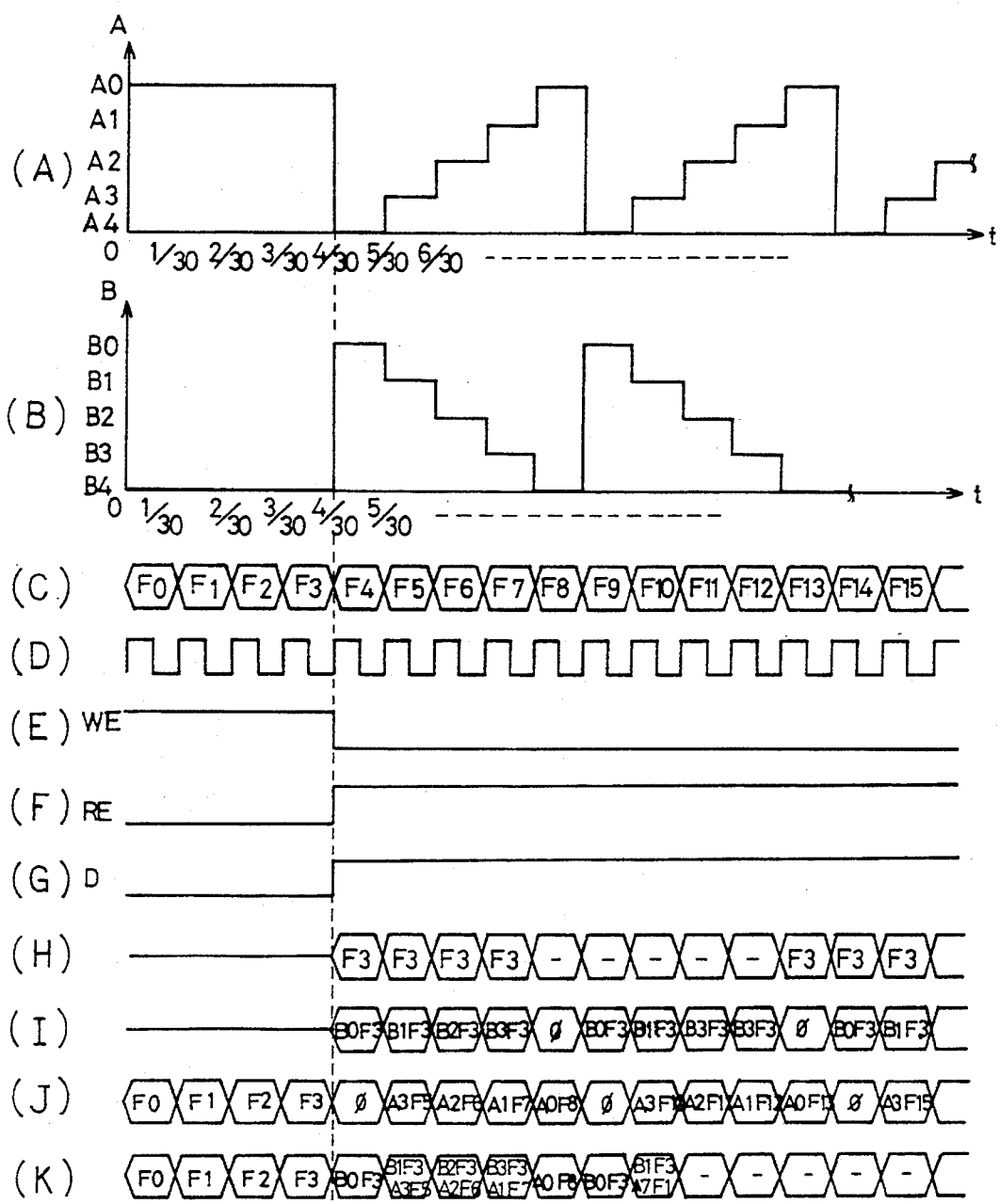
FIGS. 2A through 2K are timing diagrams illustrating the operation of the overlap apparatus of FIG. 1 in accordance with the present invention.

The operation of the overlap apparatus for the digital TV with the above-mentioned construction in accordance with the present invention will now be described in detail with reference to FIGS. 2 and 3.

When the user selects the overlap/normal mode select switch of the remote transmitter 11 in the overlap control unit 10 in a normal mode in order to watch a desired specific video which is overlapped on the current video on the screen while he or she watches TV, from the controller 12 in the overlap control unit 10, the input video multiplier factor A is outputted to the first multiplier 21 in the overlap processing unit 20 as A0=1 as shown in FIG. 2A, the feedback video multiplier factor B is outputted to the second multiplier 22 in the overlap processing unit 20 as B4=0 as shown in FIG. 2B, and a write mode control signal to the frame memory 41 in the overlap video storing unit 40 is outputted to the memory controller 42. As a result, the memory controller 42 generates a write enable signal WE as an active signal as shown in FIG. 2E, thereby enabling the frame memory 41 to operate in a write mode.

As a result, in the normal mode, the video signal inputted through the input terminal IN is outputted from the first multiplier 21 in the overlap processing unit 20 directly without any multiplying operation, since the input video multiplier factor A is outputted as A0=1 from the controller 12 to the first multiplier 21. Also, because the frame memory 41 is in the write enable state and the feedback video multiplier factor B is outputted as B4=0 from the controller 12 to the second multiplier 22, no signal is outputted from the second multiplier 22 in the overlap processing unit 20. As a result, the adder 23 in the overlap processing unit 20 transfers the original input video signal from the first multiplier 21 directly to the overflow limiting unit 30 without any combining operation. Then, the overflow limiting unit 30 performs a linear or non-linear signal processing operation to limit the overflow characteristic of the output signal from the overlap processing unit 20. The output signal from the overflow limiting unit 30 is transferred to the D/A converter 50 and the frame memory 41 in the overlap video storing unit 40. The D/A converter 50 converts the output signal from the overflow limiting unit 30 into an analog video signal and outputs the analog video signal to the monitor. That is, in the normal mode, the original input video signal is outputted from the apparatus. Also, the input video signal from the overflow limiting unit 30 is stored in the frame memory 41 in the overlap video storing unit 40 by the frame F0, F1, F2, F3, . . . , as shown in FIG. 2C.

Then, under the condition that the input video signal is stored in the previously selected normal mode, when the user pushes the overlap/normal mode select switch of the remote transmitter 11 in order to select an overlap mode at instant T1 at which is outputted the specific video to be overlapped, from the controller 12 in the overlap control unit 10 just after the instant T1, the input video multiplier factor A being increased by the frame step is outputted to the first multiplier 21 in the overlap processing unit 20 as A4, A3, A2, A1 and A0 as shown in FIG. 2A, the feedback video multiplier factor B being decreased by the frame step is outputted to the second multiplier 22 in the overlap processing unit 20 as B0, B1, B2, B3 and B4 as shown in FIG. 2B, and a read mode control signal to the frame memory 41 in the overlap video storing unit 40 is outputted to the memory controller 42.

As a result, the memory controller 42 generates a read enable signal RE as an active signal as shown in FIG. 2F, thereby enabling the frame memory 41 to operate in a read mode.

Herein, A4, A3, A2, A1 and A0 illustrate the input video multiplier factor A which is increased from "0" to "1" by the frame step; B0, B1, B2, B3 and B4 illustrate the feedback video multiplier factor B which is decreased from "1" to "0" by the frame step.

Accordingly, in the overlap mode, the video signal inputted through the input terminal IN is multiplied by the input video multiplier factors A4, A3, A2, A1 and A0 by the frame step by the first multiplier 21 in the overlap processing unit 20, beginning with the input video signal of frame F4 just after the instant T1, as shown in FIG. 2J, since the input video multiplier factor A being increased by the frame step is outputted as A4, A3, A2, A1 and A0 from the controller 12 to the first multiplier 21. For this reason, the input video signal, the level of which is increased gradually, is applied from the first multiplier 21 to the adder 23 in the overlap processing unit 20. Also, because the frame memory 41 in the overlap video storing unit 40 is in the read enable state, video data of frame F3 just before the instant T1 is outputted as the feedback video signal to be overlapped from the frame memory 41, as shown in FIG. 2H. Since the feedback video multiplier factor B decreased by the frame step is outputted as B0, B1, B2, B3 and B4 from the controller 12 to the second multiplier 22, the feedback video signal of the frame F3 from the frame memory 41 is multiplied by the feedback video multiplier factors B0, B1, B2, B3 and B4 by the frame step by the second multiplier 22 in the overlap processing unit 20, as shown in FIG. 2I. As a result, the feedback video signal, the level of which is decreased gradually, is applied from the second multiplier 22 to the adder 23 in the overlap processing unit 20.

Then, the adder 23 combines the input video signal, the level of which is increased gradually, outputted from the first multiplier 21 with the feedback video signal, the level of which is decreased gradually, outputted from the second multiplier 22. As a result, as shown in FIG. 2K, after the instant T1, the level of the video signal of the previous frame F3 is decreased gradually, while the level of the video signal of the subsequent new frame beginning with the frame F4 is increased gradually. The adder 23 outputs the overlapped video signal in which the input video signal, the level of which is increased gradually, is combined with the feedback video signal, the level of which is decreased gradually, to the overflow limiting unit 30. Then, the overflow limiting unit 30 performs a linear or non-linear signal processing operation to limit the overflow characteristic of time overlapped video signal from the adder 23 in the overlap processing unit 20. The output signal from the overflow limiting unit 30 is then transferred to the D/A converter 50. The D/A converter 50 converts the output signal from the overflow limiting unit 30 into an analog video signal and outputs the overlapped video signal as the analog video signal to the monitor.

That is, in the overlap mode, the apparatus outputs the overlapped video in which the new input video appears gradually on the screen while the video just before the instant T1 disappears gradually from the screen. Then, while the user continues to select the overlap mode, the overlap operation is performed repeatedly. Namely, the previous video (F3) appears on the screen every frame corresponding to the number of the multiplier factors (herein, five) and disappears after being gradually substituted by the current video.

Thereafter, when the user pushes the overlap/normal mode select switch of the remote transmitter 11 in order to select the normal mode after the user enjoys the overlapped video on the screen, the apparatus performs the operation which outputs the input video directly as the current video and stores the current video by the frame, as mentioned above.

Also, in accordance with the preferred embodiment of the present invention, the remote transmitter 11 may include an overlap recording switch for storing a specific video. If the user selects the overlap recording switch, the operation of the apparatus is substantially the same as that in the normal mode, with the exception that video at the point of time the overlap recording switch is selected is stored as the video to be overlapped. Then, in the overlap mode, the stored overlap video is provided as the feedback video. Therefore, the video to be overlapped can be selected and stored as a specific video desired by the user and, if necessary, an overlap operation of a specific video with the current video on the screen can be obtained.

In accordance with another embodiment of the present invention, the input video multiplier factor and the feedback video multiplier factor may be fixed at a predetermined level, respectively. Therefore, a specific video can continuously be provided as a background video on the screen with being overlapped on the current video on the screen.

As hereinbefore described, in accordance with the present invention, an overlap apparatus is provided for the digital TV, which is capable of storing a desired specific video and overlapping the stored specific video on the current video on the screen in accordance with a selection by the user, by a simple operation of the remote transmitter by the user, when the user would like to watch the desired specific video which is overlapped on the current video on the screen while he or she watches TV. Therefore, the user can enjoy the overlapped video on the screen by his or her own selection. Also, the overlap apparatus of the invention may be employed in VCR applications, resulting in extension of its function.

Although the preferred embodiments of the present invention have been disclosed for illustrative purpose, those skilled in the art will appreciate that various modifications, additions and substitutions are possible, without departing from the scope and spirit of the invention as disclosed in the accompanying claims.

What is claimed is:

1. An overlap apparatus for a digital TV, comprising: operation of the apparatus in accordance with a selection of the user;

overlap processing means for gradually increasing a level of an input video signal and gradually decreasing a level of a feedback video signal to be overlapped in an overlap mode control of said overlap control means, to generate an overlapped video signal in which the input video signal is combined with the feedback video signal;

overflow limiting means for limiting an overflow characteristic of an output signal from said overlap processing means;

overlap video storing means for storing an output signal from said overflow limiting means in a normal mode control of said overlap control means and outputting the signal stored therein as the feedback video signal to said overlap processing means in the overlap mode control of said overlap control means; and digital/analog converting means for converting the output signal from said overflow limiting means into an analog signal and outputting the analog signal to a monitor.

2. The apparatus as set forth in claim 1, wherein said overlap control means includes:

a remote transmitter with an overlap/normal mode select switch; and a controller for outputting an input video multiplier factor to be gradually increased, a feedback video multiplier factor to be gradually decreased and a memory control signal, in response to an overlap mode select signal from said remote transmitter in accordance with a selection of the user.

3. The apparatus as set forth in claim 1, wherein said overlap processing means includes:

a first multiplier for multiplying the input video signal by an input video multiplier outputted from said overlap control means to gradually increase the level of the input video signal;

a second multiplier for multiplying the feedback video signal from said overlap storing means by a feedback video multiplier factor outputted from said overlap control means to gradually decrease the level of the feedback video signal; and an adder for combining an output signal from said first multiplier with an output signal from said second multiplier to output the overlapped video signal to said overflow limiting means.

4. The apparatus as set forth in claim 1, wherein said overlap video storing means includes a frame memory for storing the output signal from said overflow limiting means by the frame; and a memory controller for, controlling read/write operations of said frame memory in response to a memory control signal from said overlap control means.

5. An apparatus for combining signals in a digital TV system, comprising:

a first source for providing a first digital video signal;

a second source for providing a second digital video signal;

first and second digital multipliers connected to receive said first and second video signals, respectively, each having a controllable multiplication factor;

means connected to inversely control the multiplication factors of said first and second digital multipliers;

digital adding means connected to digitally add multiplied outputs of said first and second digital multipliers;

means for digitally limiting the added output of said digital adding means; and means for converting a limited output of said digital limiting means to an analog signal, to thereby provide a combined output signal, and wherein said second source comprises a memory connected to receive output signals from said digital limiting means, and means for selectively controlling said memory to record said output signals from said digital limiting means and apply signals stored therein to said second digital multiplier.

6. The apparatus of claim 5 further comprising remote transmitter means with an overlap/normal mode select switch; and said means connected to inversely control said multiplication factors comprises receiver means for receiving signals from said transmitter.

7. The apparatus of claim 5 wherein said memory comprises a frame memory for storing a frame of video signals output from said limiting means.

* * * * *